(12) United States Patent  (10) Patent No.: US 7,904,330 B2
Uyama et al.  (45) Date of Patent: Mar. 8, 2011

(54) EVENT TYPE ESTIMATION SYSTEM, EVENT TYPE ESTIMATION METHOD, AND EVENT TYPE ESTIMATION PROGRAM STORED IN RECORDING MEDIA

(75) Inventors: Masashi Uyama, Kawasaki (JP);
Yasuhide Matsumoto, Kawasaki (JP);
Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 11/943,201

(22) Filed: Nov. 20, 2007

(65) Prior Publication Data

US 2008/0126538 A1  May 29, 2008

(30) Foreign Application Priority Data

Nov. 29, 2006  (JP) ................................ 2006-322224

(51) Int. Cl.
*G06F 17/00* (2006.01)
(52) U.S. Cl. ......................................................... 705/10
(58) Field of Classification Search ..................... 705/10
See application file for complete search history.

(56) References Cited

U.S. PATENT DOCUMENTS

2005/0283680 A1  12/2005  Kobayashi et al.
2006/0218278 A1  9/2006  Uyama et al.

FOREIGN PATENT DOCUMENTS

| JP | 2002-123516 A | 4/2002 |
|---|---|---|
| JP | 2002-175240 A | 6/2002 |
| JP | 2004-110327 A | 4/2004 |
| JP | 2005-196675 A | 7/2005 |
| JP | 2006-4346 A | 1/2006 |
| JP | 2006-268529 | 10/2006 |
| JP | 2006-268529 A | 10/2006 |

OTHER PUBLICATIONS

K. Yamanishi et al; "Three Methods of Statistical Anomaly Detection," IPSJ Magazine; Jan. 2005; vol. 46, No. 1; pp. 34-40.
"Access Log Analysis Tools," iNTERNET magazine, Impress Corporation, Dec. 2005; No. 131, pp. 106-109.
"Access Log Analysis Tools," Internet Magazine, Impress Corporation, Dec. 2005; No. 131, pp. 106-109.

*Primary Examiner* — Thomas Dixon
(74) *Attorney, Agent, or Firm* — Fujitsu Patent Center

(57) ABSTRACT

An event type estimation system includes a log aggregation unit that generates time-series data representing the fluctuation in traffic to a site from log data, a deviation testing unit that extracts an interval showing an anomalous fluctuation from the time-series data, a waveform decomposition unit that optimizes a peak waveform, a normal waveform and a vertical waveform set by a waveform setting unit, in order to approximate the fluctuation in traffic in the interval extracted by the deviation testing unit with a composite of the peak waveform, the normal waveform and the vertical waveform, and an event determination unit that determines the type of event that caused the anomalous fluctuation, based on the waveforms optimized by the waveform decomposition unit and the rules of a rule recording unit. The event type estimation system is thereby able to extract access fluctuation anomalies from log data and estimate the type of event that caused the anomalous fluctuation.

7 Claims, 7 Drawing Sheets

| Condition | Event type |
|---|---|
| c/b>Cmax | In-site event |
| c/b<Cmin | External-site event |
| c/b>Cave AND a/b>Aave | Advertised event |
| c/b>Cave AND a/b<Aave | Unadvertised event |
| ... | ... |

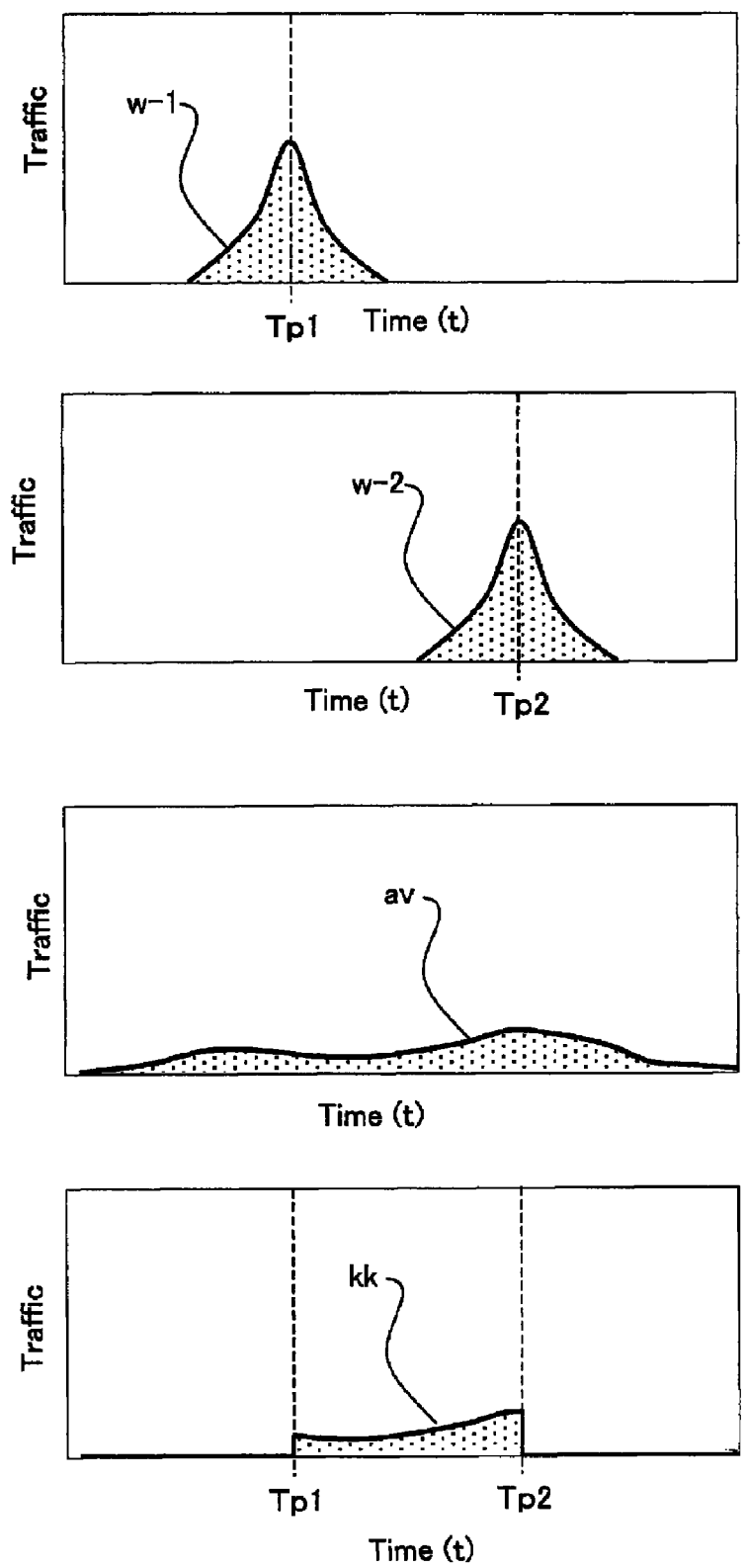
F I G. 9

US 7,904,330 B2

EVENT TYPE ESTIMATION SYSTEM, EVENT TYPE ESTIMATION METHOD, AND EVENT TYPE ESTIMATION PROGRAM STORED IN RECORDING MEDIA

FIELD OF THE INVENTION

The present invention relates to a system, method and computer program for analyzing a log showing access history to a site provided by a computer connected to a network, and generating information that supports management and operation, etc. of the computer providing the site.

BACKGROUND OF THE INVENTION

Traffic from user terminals to an e-commerce, e-banking or online shopping website, for example, is affected not only by seasonal and other long-term fluctuations, but also by business-related events such as promotions. That is, traffic to a website fluctuates as a result of changes in user behavior from normal conditions due to an event of some sort. For example, a company may experience a sharp increase in traffic to their website when a promotion is held in connection with services provided by the website, after which traffic may gradually subside.

Someone using a website to do business such as the above company can operate the website efficiently in line with the amount of traffic received, by forecasting medium-term fluctuations in traffic caused by business-related events such as promotions, as well as forecasting seasonal and other long-term fluctuations in traffic. Techniques for forecasting fluctuations in traffic are thus extremely useful.

Generally, demand forecasting is performed by invoking regularity derived from past fluctuations in traffic and the regularity of changes in regularity in forecasting the future. In forecasting fluctuations resulting from events, the cases of past events need to be analyzed and the characteristics of fluctuations in traffic extracted. For example, in a prior invention by the present applicant (see JP 2006-268529A), the temporal fluctuation patterns of traffic caused by past events and past event information are saved in a database called an event characteristics model, and utilized in forecasting. Generally, temporal fluctuations in traffic to a website are obtained from the access log of the website.

Traffic to a website is represented, for example, by the page view count, the session count, or the session start count. The page view count is the number of views from user terminals to the main pages constituting a website. A session is a sequence of consecutive accesses from the same user terminal (same host). That is, a series of accesses from the same user terminal is treated as one session. Note that in the case where the interval between accesses from the same user terminal is greater than a fixed time period (e.g., 30 min), subsequent accesses are viewed as a different session from accesses prior to the fixed period.

As for the access log for a website, a log of communication using HTTP (HyperText Transfer Protocol) is commonly saved at present. Generally, the HTTP log records information relating to one access per line. In this case, a session ID identifying the session of the access is sometimes assigned to each line. The session count is the number of unique sessions within a prescribed period. The session count can, for example, be acquired by counting the number of unique session IDs within the prescribed period in the HTTP log. In contrast, the session start count is the number of sessions newly started within a prescribed period.

The kind of event that occurred is not saved in the actual access log of a website at this time. With the foregoing prior invention, event information concerning the website is thus separately input from an external source. That is, while the access log of a website can easily be accumulated using the web server function, there is no means for recording information about the events that cause characteristic fluctuations in accesses to a website in association with the access log. Further, a system that estimates event type from the log accumulated in a web server does not exist conventionally. Thus, even if the access log for the website can be obtained, it is quite often the case that performance data showing fluctuations in traffic cannot be utilized in forecasting in the case where the corresponding event implementation history cannot be obtained.

On the other hand, there already exist numerous anomaly detection methods that analyze the log and detect access fluctuation anomalies (e.g., see non-patent document 1 below). Non-patent document 1 describes three anomaly detection methods. These methods stop at detecting anomalous fluctuations in traffic, and do not identify the cause of anomalies.

Non-patent document 1: Yamanishi, K., Takeuchi, J., Maruyama, Y., "Three Methods of Statistical Anomaly Detection" (in Japanese), IPSJ Magazine, vol. 46, no. 1, pp. 34-40, published on Jan. 15, 2005.

Systems that forecast shifts in anomalous values in addition to detecting anomalies have also been disclosed (e.g., see JP 2005-196675A). JP 2005-196675A describes a process that involves calculating anomalous values for the number of recorded events from the log for a network device or the like, and forecasting subsequent shifts in the anomalous values based on Bayesian inference. An "event" in JP 2005-196675A is a parameter in the log containing a specific item, such as HTTP port probe or Smurf attack, for example. This is different from an event in the present invention. An event in the present invention indicates the cause of a characteristic fluctuation in traffic represented in the log data (e.g., promotions, website advertising, TV commercials, street campaigns). Despite the same word "event" being used, JP 2005-196675A does not describe a process for estimating the type of event that causes a change in user behavior.

Conventionally, there have been numerous commercial products that analyze website logs (e.g., see non-patent document 2 below). Non-patent document 2 introduces log analysis tools such as Urchin and SiteCatalyst. These log analysis tools function to aggregate and visualize changes in the number of visitors due to advertising, the probability of users who view certain pages making a purchase, transitions in traffic over time, and so forth. However, these log analysis tools do not have means for extracting the type of events conducted in the past from a log.

Non-patent document 2: "Access Log Analysis Tools" (in Japanese), iNTERNET magazine, Impress Corporation, published on Dec. 1, 2005, December 05 issue, p. 106, 2005.

SUMMARY OF THE INVENTION

In view of the above, an object of the present invention is to provide an event type estimation system, an event type estimation method and an event type estimation program that are able to extract access fluctuation anomalies from log data showing access history from user terminals to a site, and estimate the type of event that caused the anomalous fluctuation.

An event type estimation system according to the present invention includes a log aggregation unit that generates, from log data showing access history from a user terminal to at least one site provided by a computer connected to a network, performance time-series data representing a fluctuation in traffic to the site; a deviation testing unit that extracts, from the performance time-series data generated by the log aggregation unit, an interval showing an anomalous fluctuation in which the fluctuation in traffic deviates from a reference fluctuation in traffic, by referring to a reference fluctuation recording unit that records the reference fluctuation; a peak fluctuation pattern setting unit that generates, based on the performance time-series data, peak fluctuation time-series data representing a fluctuation pattern in which traffic in all or part of the interval extracted by the deviation testing unit exhibits an increasing tendency over time from a start time point and, on reaching a time point defining a peak, exhibits a decreasing tendency to an end time point, and records the generated peak fluctuation time-series data in a fluctuation pattern recording unit; a normal fluctuation pattern setting unit that generates, based on the performance time-series data or prerecorded data, normal fluctuation time-series data representing a fluctuation pattern, in the interval extracted by the deviation testing unit, of traffic under normal conditions without anomalous fluctuation, and records the generated normal fluctuation time-series data in the fluctuation pattern recording unit; a vertical fluctuation pattern setting unit that generates, based on the performance time-series data, vertical fluctuation time-series data representing a fluctuation pattern in which traffic increases or decreases in an interval of part of the interval extracted by the deviation testing unit, and records the generated vertical fluctuation time-series data in the fluctuation pattern recording unit; a waveform decomposition unit that optimizes the peak fluctuation time-series data, the normal fluctuation time-series data and the vertical fluctuation time-series data, by repeating a process of calculating a composite fluctuation by combining the fluctuation patterns represented by the peak fluctuation time-series data, the normal fluctuation time-series data and the vertical fluctuation time-series data recorded in the fluctuation pattern recording unit, and a process of comparing the composite fluctuation with the fluctuation in traffic in the interval extracted by the deviation testing unit out of the fluctuation in traffic represented by the performance time-series data generated by the log aggregation unit, and a process of updating the peak fluctuation time-series data, the normal fluctuation time-series data and the vertical fluctuation time-series data whenever the composite fluctuation is calculated, so that the composite fluctuation approximates the fluctuation in traffic represented by the performance time-series data; a rule recording unit that records a rule showing a relation between a type of event that causes anomalous fluctuation and the peak fluctuation time-series data, the normal fluctuation time-series data, and the vertical fluctuation time-series data; and an event determination unit that determines a type of event that caused the anomalous fluctuation in the interval, based on the rule recorded in the rule recording unit and the peak fluctuation time-series data, the normal fluctuation time-series data and the vertical fluctuation time-series data optimized by the waveform decomposition unit.

The log aggregation unit generates performance time-series data representing the fluctuation in traffic to a site from log data. Fluctuations in traffic to a site are affected by events such as campaigns, commercials, and advertising related to contents provided by the site, for example. The deviation testing unit is able to extract an interval in which the fluctuation in traffic is highly likely to have been affected by an event, by extracting an interval showing anomalous fluctuation in which the fluctuation in traffic shown by the performance time-series data deviates from a prescribed reference fluctuation. The peak fluctuation pattern setting unit records in the fluctuation pattern recording unit peak fluctuation time-series data representing the component of traffic that fluctuates into a single peak, out of the fluctuation in traffic shown by the performance time-series data in the interval extracted by the deviation testing unit. The normal fluctuation pattern setting unit generates and records normal fluctuation time-series data representing the fluctuation pattern under normal conditions in the interval extracted by the deviation testing unit. The vertical fluctuation pattern setting unit generates and records vertical fluctuation time-series data representing a fluctuation pattern in which traffic increases or decreases in a part of the interval extracted by the deviation testing unit. The waveform decomposition unit optimizes the peak fluctuation time-series data, the normal fluctuation time-series data and the vertical fluctuation time-series data, so that a composite fluctuation that combines the respective fluctuation patterns shown by the peak fluctuation time-series data, the normal fluctuation time-series data and the vertical fluctuation time-series data approximates the fluctuation in traffic shown by the performance time-series data. The fluctuation in traffic shown by the performance time-series data can thereby be represented by the peak fluctuation time-series data, the normal fluctuation time-series data and the vertical fluctuation time-series data. That is, the characteristics of the fluctuation in traffic shown by the performance time-series data are represented by the foregoing time-series data. Since the characteristics of the fluctuation in traffic tend to differ depending on the type of event that causes the fluctuation, the event determination unit is able to determine the type of event that caused anomalous fluctuation in an interval, based on rules recorded in the rule recording unit and the foregoing time-series data optimized by the waveform decomposition unit. As a result, access fluctuation anomalies can be extracted from log data, and the type of event that caused the anomalous fluctuation can be estimated.

The event type estimation system according to the present invention preferably further includes a normal fluctuation recording unit that records normal fluctuation data representing the fluctuation in traffic under normal conditions without anomalous fluctuation in the interval extracted by the deviation testing unit; a page log aggregation unit that extracts a plurality of page sets each including at least one page constituting part of the site, and generates, based on the log data, page fluctuation data representing, for each page of the extracted page sets, the fluctuation in traffic, in the interval extracted by the deviation testing unit, of a session group that includes accesses to each page of the page sets; and a session separation unit that calculates, for each page of the page sets shown by the page fluctuation data generated by the page log aggregation unit, a degree of difference between a fluctuation that combines the fluctuation in traffic of the session group that includes accesses to the page and the fluctuation shown by the normal fluctuation data recorded in the normal fluctuation recording unit, and the fluctuation in traffic in the interval extracted by the deviation testing unit out of the fluctuation in traffic represented by the performance time-series data generated by the log aggregation unit, and selects a target page from the page sets based on the degree of difference. The waveform decomposition unit preferably optimizes the peak fluctuation time-series data, the normal fluctuation time-series data and the vertical fluctuation time-series data, by repeating a process of comparing the composite fluctuation with the fluctuation in traffic of the session group that includes accesses to the target page selected by the session separation unit, out of the fluctuation in traffic represented by the performance time-series data generated by the log aggregation unit.

In the foregoing configuration, the session separation unit calculates the degree of difference between the fluctuation in traffic shown by performance time-series data and a fluctuation that combines the fluctuation in traffic of a session group that includes accesses to each page of the page sets and the fluctuation shown by the normal fluctuation data of the normal fluctuation recording unit, and selects a target page based on the calculated degree of difference. Since the actual fluctuation in traffic shown by the performance time-series data is considered to be made up of the fluctuation component under normal conditions plus the component of anomalous fluctuation in traffic, the degree of difference becomes smaller with increases in the component of anomalous fluctuation, which differs from the fluctuation under normal conditions, that is included in the fluctuation in traffic of the session group that includes accesses to the page. The degree of difference is correlated to how much the page contributes to anomalous fluctuation. Thus, since the session separation unit selects target pages based on the degree of difference, the target pages are selected according to the component of anomalous fluctuation included in the fluctuation in traffic. Pages that contribute to the anomalous fluctuation in traffic shown by the performance time-series data can thus be selected as target pages. The waveform decomposition unit optimizes the peak fluctuation time-series data, the normal fluctuation time-series data and the vertical fluctuation time-series data, so that the fluctuation in traffic to target pages contributing to the anomalous fluctuation is approximated by the composite fluctuation of the peak fluctuation time-series data, the normal fluctuation time-series data and the vertical fluctuation time-series data. Since the event determination unit thus determines the type of event using the time-series data optimized in order to approximate the fluctuation in traffic to target pages contributing to the anomalous fluctuation, determination accuracy is improved.

The event type estimation system according to the present invention preferably further includes a composition ratio increment testing unit that executes, in relation to each of at least a part of the pages constituting the site, an extracted interval composition ratio calculation process of calculating per page, based on the log data, a proportion of traffic to the part of the pages to traffic to the site as a whole in the interval extracted by the deviation testing unit, and a reference interval composition ratio calculation process of calculating per page, based on the log data, a proportion of traffic to the part of the pages to traffic to the site as a whole in a prescribed interval prior to the interval extracted by the deviation testing unit, and selects a target page to be targeted for processing by the waveform decomposition unit, by comparing, per page, the proportion calculated in the extracted interval composition ratio calculation process and the proportion calculated in the reference interval composition ratio calculation process. The waveform decomposition unit preferably optimizes the peak fluctuation time-series data, the normal fluctuation time-series data and the vertical fluctuation time-series data, by repeating a process of comparing the composite fluctuation with the fluctuation in traffic of the session group that includes accesses to the target page selected by the composition ratio increment testing unit, out of the fluctuation in traffic represented by the performance time-series data generated by the log aggregation unit.

According to the foregoing configuration, the composition ratio increment testing unit is able to select target pages, depending on how much the proportion of traffic to the pages to traffic to the site as a whole in the interval extracted by the deviation testing unit has changed relative to a prescribed interval prior to the extracted interval. The composition ratio increment testing unit is thus able to extract pages to which the increase in accesses is particularly marked as target pages. The waveform decomposition unit calculates the peak fluctuation time-series data, the normal fluctuation time-series data and the vertical fluctuation time-series data, by comparing the composite waveform with the fluctuation in traffic to pages to which the increase in accesses is particularly marked. Since the event determination unit determines the type of event based on this peak fluctuation time-series data, normal fluctuation time-series data and vertical fluctuation time-series data, determination accuracy is improved.

The event type estimation system according to the present invention preferably further includes a session duration testing unit that calculates, based on the log data, an access duration of accesses started in each partial interval obtained in a case where the interval extracted by the deviation testing unit is divided at the peak time point of the fluctuation in traffic represented by the peak fluctuation time-series data generated by the peak fluctuation pattern setting unit. The rule recording unit preferably further records a session duration rule showing a relation between the access duration and the type of event that causes anomalous fluctuation, and the event determination unit preferably determines the type of event further using the access duration calculated by the session duration testing unit and the session duration rule.

In the case where the fluctuation in traffic resulting from some sort of event exhibits a peak-shaped fluctuation, the access duration often exhibits a different tendency before and after the peak. The extent of this difference is readily affected by the type of event. The session duration testing unit calculates the duration of accesses started in respective partial intervals divided at the peak, and the event determination unit determines the type of event that causes anomalous fluctuation further using the session duration rule and the calculated access duration. The event determination unit is thus able to determine the type of event, with consideration given to differences in the access durations before and after the peak. As a result, more accurate determination of event type utilizing the characteristics of session duration becomes possible.

In the event type estimation system according to the present invention, the peak fluctuation pattern setting unit preferably generates peak fluctuation time-series data representing a fluctuation pattern in which traffic in each of two different intervals within the interval extracted by the deviation testing unit exhibits an increasing tendency over time from a start time point and, on reaching a time point defining a peak, exhibits a decreasing tendency to an end time point, and records the generated peak fluctuation time-series data in the fluctuation pattern recording unit.

A plurality of peaks sometimes occur in the fluctuation in traffic resulting from a single event, as in the case where traffic peaks at the start and end time point of an event, for example. In the foregoing configuration, the peak fluctuation pattern setting unit generates peak fluctuation time-series data representing a fluctuation pattern in which traffic in each of two different intervals within the interval extracted by the deviation testing unit exhibits an increasing tendency over time from a start time point and, on reaching a time point defining a peak, exhibits a decreasing tendency to an end time point, and records the generated peak fluctuation time-series data in a waveform recording unit. The waveform decomposition unit thereby calculates a composite fluctuation using peak fluctuation time-series data that includes two peak-shaped fluctuations. A composite fluctuation that is more close to the fluctuation that includes a plurality of peaks in the fluctuation in traffic is thus calculated. It is thus possible to accurately determine the type of event in the case where the performance time-series data exhibits fluctuation in which a plurality of peaks occur in the fluctuation in traffic resulting from a single event.

An event type estimation method according to the present invention includes a log aggregation operation in which a log aggregation unit provided in a computer generates, from log data showing access history from a user terminal to at least one site provided through a network, performance time-series data representing a fluctuation in traffic to the site; a deviation testing operation in which a deviation testing unit provided in the computer extracts, from the performance time-series data generated by the log aggregation operation, an interval showing an anomalous fluctuation in which the fluctuation in traffic deviates from a reference fluctuation in traffic, by referring to a reference fluctuation recording unit that records the reference fluctuation; a peak fluctuation pattern setting operation in which a peak fluctuation pattern setting unit provided in the computer generates, based on the performance time-series data, peak fluctuation time-series data representing a fluctuation pattern in which traffic in all or part of the interval extracted in the deviation testing operation exhibits an increasing tendency over time from a start time point and, on reaching a time point defining a peak, exhibits a decreasing tendency to an end time point, and records the generated peak fluctuation time-series data in a fluctuation pattern recording unit; a normal fluctuation pattern setting operation in which a normal fluctuation pattern setting unit provided in the computer generates, based on the performance time-series data or prerecorded data, normal fluctuation time-series data representing a fluctuation pattern, in the interval extracted in the deviation testing operation, of traffic under normal conditions without anomalous fluctuation, and records the generated normal fluctuation time-series data in the fluctuation pattern recording unit; a vertical fluctuation pattern setting operation in which a vertical fluctuation pattern setting unit provided in the computer generates, based on the performance time-series data, vertical fluctuation time-series data representing a fluctuation pattern in which traffic increases or decreases in an interval of part of the interval extracted in the deviation testing operation, and records the generated vertical fluctuation time-series data in the fluctuation pattern recording unit; a waveform decomposition operation in which a waveform decomposition unit provided in the computer optimizes the peak fluctuation time-series data, the normal fluctuation time-series data and the vertical fluctuation time-series data, by repeating a process of calculating a composite fluctuation by combining the fluctuation patterns represented by the peak fluctuation time-series data, the normal fluctuation time-series data and the vertical fluctuation time-series data recorded in the fluctuation pattern recording unit, and a process of comparing the composite fluctuation with the fluctuation in traffic in the interval extracted in the deviation testing operation out of the fluctuation in traffic represented by the performance time-series data generated in the log aggregation operation, and a process of updating the peak fluctuation time-series data, the normal fluctuation time-series data and the vertical fluctuation time-series data whenever the composite fluctuation is calculated, so that the composite fluctuation approximates the fluctuation in traffic represented by the performance time-series data; and an event determination operation in which an event determination unit provided in the computer determines a type of event that caused the anomalous fluctuation in the interval, based on the peak fluctuation time-series data, the normal fluctuation time-series data and the vertical fluctuation time-series data optimized in the waveform decomposition operation, by referring to a rule recording unit that records a rule showing a relation between a type of event that causes anomalous fluctuation and the peak fluctuation time-series data, the normal fluctuation time-series data, and the vertical fluctuation time-series data.

An event type estimation program stored in a recording media according to the present invention causes a computer to execute a log aggregation process of generating, from log data showing access history from a user terminal to at least one site provided by a computer connected to a network, performance time-series data representing a fluctuation in traffic to the site; a deviation testing process of extracting, from the performance time-series data generated by the log aggregation unit, an interval showing an anomalous fluctuation in which the fluctuation in traffic deviates from a reference fluctuation in traffic, by referring to a reference fluctuation recording unit that records the reference fluctuation; a peak fluctuation pattern setting process of generating, based on the performance time-series data, peak fluctuation time-series data representing a fluctuation pattern in which traffic in all or part of the interval extracted in the deviation testing process exhibits an increasing tendency over time from a start time point and, on reaching a time point defining a peak, exhibits a decreasing tendency to an end time point, and recording the generated peak fluctuation time-series data in a fluctuation pattern recording unit; a normal fluctuation pattern setting process of generating, based on the performance time-series data or prerecorded data, normal fluctuation time-series data representing a fluctuation pattern, in the interval extracted in the deviation testing process, of traffic under normal conditions without anomalous fluctuation, and recording the generated normal fluctuation time-series data in the fluctuation pattern recording unit; a vertical fluctuation pattern setting process of generating, based on the performance time-series data, vertical fluctuation time-series data representing a fluctuation pattern in which traffic increases or decreases in an interval of part of the interval extracted in the deviation testing process, and recording the generated vertical fluctuation time-series data in the fluctuation pattern recording unit; a waveform decomposition process of optimizing the peak fluctuation time-series data, the normal fluctuation time-series data and the vertical fluctuation time-series data, by repeating a process of calculating a composite fluctuation by combining the fluctuation patterns represented by the peak fluctuation time-series data, the normal fluctuation time-series data and the vertical fluctuation time-series data recorded in the fluctuation pattern recording unit, and a process of comparing the composite fluctuation with the fluctuation in traffic in the interval extracted in the deviation testing process out of the fluctuation in traffic represented by the performance time-series data generated in the log aggregation process, and a process of updating the peak fluctuation time-series data, the normal fluctuation time-series data and the vertical fluctuation time-series data whenever the composite fluctuation is calculated, so that the composite fluctuation approximates the fluctuation in traffic represented by the performance time-series data; and an event determination process of determining a type of event that caused the anomalous fluctuation in the interval, based on the peak fluctuation time-series data, the normal fluctuation time-series data and the vertical fluctuation time-series data optimized in the waveform decomposition process, by referring to a rule recording unit that records a rule showing a relation between a type of event that causes anomalous fluctuation and the peak fluctuation time-series data, the normal fluctuation time-series data, and the vertical fluctuation time-series data.

The present invention enables the provision of an event type estimation system, an event type estimation method and an event type estimation program capable of extracting access fluctuation anomalies from log data showing access history from user terminals to a site, and estimating the type of event that caused the anomalous fluctuation.

BRIEF DESCRIPTION OF DRAWINGS

FIG. 9 shows examples of a first peak waveform, a second peak waveform, a normal waveform, and a vertical waveform according to a second embodiment.

DESCRIPTION OF THE PREFERRED EMBODIMENTS

Embodiment 1

Figure 1:
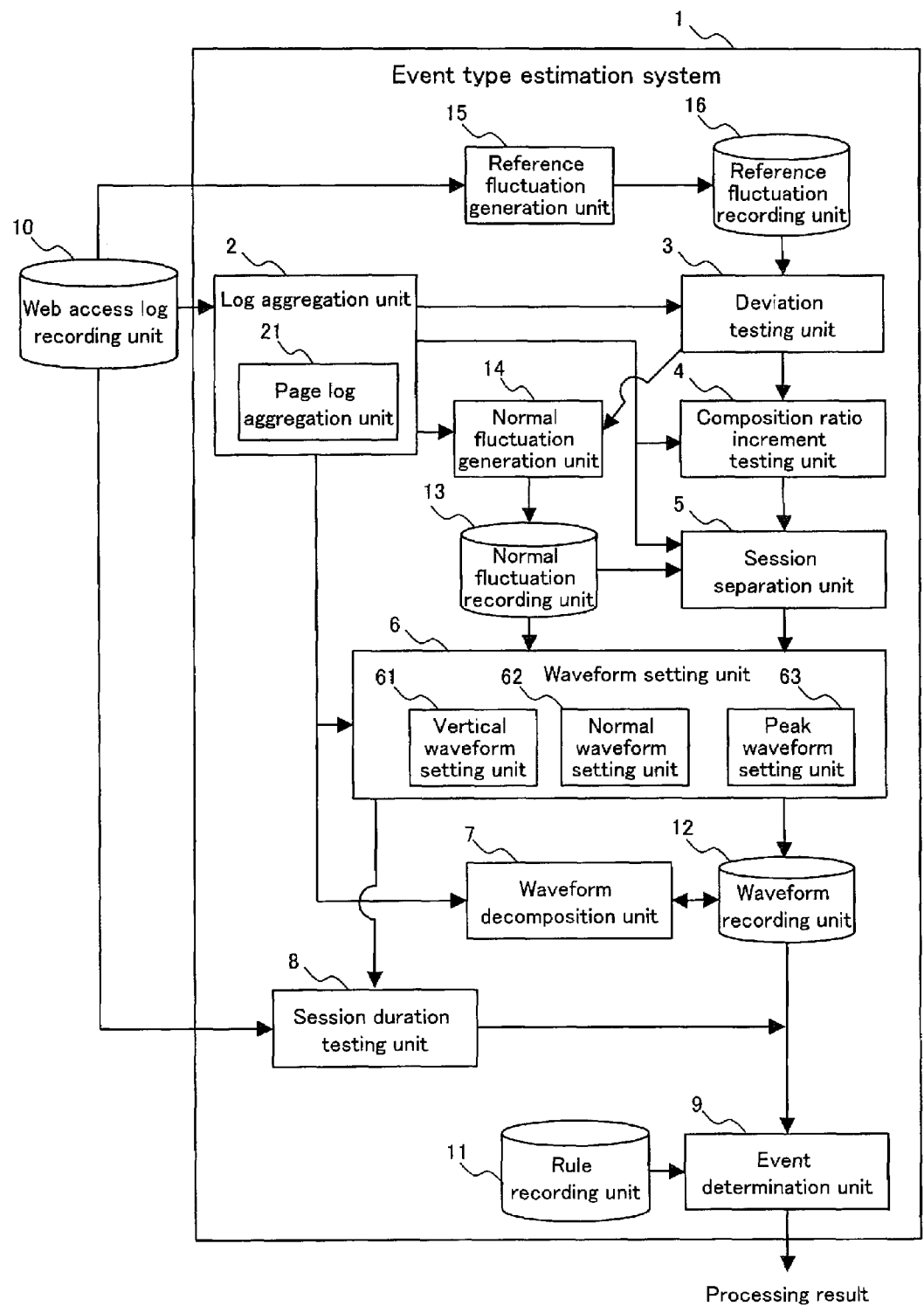
FIG. 1 is a functional block diagram showing the configuration of an event type estimation system.

FIG. 1 is a functional block diagram showing the configuration of an event type estimation system 1 according to the present invention. The event type estimation system 1 shown in FIG. 1 is connected to a web access log recording unit 10 that records log data showing website access history. The event type estimation system 1 extracts access fluctuation anomalies from log data read from the web access log recording unit 10, and estimates the type of event that caused the anomalous fluctuation.

The event type estimation system 1 shown in FIG. 1 is provided with a log aggregation unit 2, a deviation testing unit 3, a composition ratio increment testing unit 4, a session separation unit 5, a waveform setting unit 6, a waveform decomposition unit 7, a session duration testing unit 8, an event determination unit 9, a normal fluctuation generation unit 14, a reference fluctuation generation unit 15, a rule recording unit 11, a waveform recording unit 12, a normal fluctuation recording unit 13, and a reference fluctuation recording unit 16. The log aggregation unit 2 includes a page log aggregation unit 21. The waveform setting unit 6 includes a vertical waveform setting unit 61, a normal waveform setting unit 62, and a peak waveform setting unit 63.

The log aggregation unit 2 reads log data showing website access history recorded in the web access log recording unit 10, and generates performance time-series data representing the fluctuation in traffic to a website.

The deviation testing unit 3 extracts an interval (hereinafter, "anomalous fluctuation interval") showing an anomalous fluctuation, from the performance time-series data generated by the log aggregation unit 2. The deviation testing unit 3 refers to a reference fluctuation recorded in the reference fluctuation recording unit 16, when extracting the anomalous fluctuation. Here, data representing an average fluctuation in traffic is employed as the reference waveform, for example. This reference waveform is calculated by the reference fluctuation generation unit 15 based on the log data of the web access log recording unit 10, and recorded to the reference fluctuation recording unit 16. Note that the reference fluctuation is not necessarily limited to being calculated based on log data. For example, a prerecorded fixed value may be recorded in the reference fluctuation recording unit 16 as the reference fluctuation, or the reference fluctuation generation unit 15 may generate data showing the average fluctuation from the performance time-series data generated by the log aggregation unit 2, and record the generated data in the reference fluctuation recording unit 16.

The composition ratio increment testing unit 4 extracts the URLs of one or more pages to which the increase in accesses is particularly marked. At this time, the composition ratio increment testing unit 4 receives the log data of the web access log recording unit 10 via the log aggregation unit 2, and uses this data in extracting URLs.

The session separation unit 5 further extracts, from the URLs extracted by the composition ratio increment testing unit 4, the URLs of the page or set of pages that have contributed the most to the anomalous fluctuation in traffic in the anomalous fluctuation interval shown by the performance time-series data, based on the fluctuation in the session group. The session separation unit 5 receives, from the log aggregation unit 2, page fluctuation data representing, per page, the fluctuation in traffic of the session group that includes accesses to specific pages of the website, and uses the received page fluctuation data to perform the extraction. The page fluctuation data is generated by the page log aggregation unit 21.

In the above extraction, the session separation unit 5 refers to the normal fluctuation recorded in the normal fluctuation recording unit 13. The normal fluctuation is the fluctuation in traffic under normal conditions without anomalous fluctuation. The normal fluctuation generation unit 14 generates the normal fluctuation based on the performance time-series data generated by the log aggregation unit 2, and records the generated normal fluctuation to the normal fluctuation recording unit 13. The normal fluctuation is obtained, for example, by taking the average after eliminating anomalous fluctuation intervals extracted by the deviation testing unit 3 in units of days (i.e., "anomalous days") from the performance time-series data. Note that the normal fluctuation is not necessarily limited to being calculated based on the performance time-series data. For example, a prerecorded fixed value may be recorded in the normal fluctuation recording unit 13 as the normal fluctuation.

The waveform setting unit 6 sets a plurality of traffic fluctuation patterns for approximating the fluctuation in traffic in the anomalous fluctuation interval shown by the performance time-series data generated by the log aggregation unit 2. The set traffic fluctuation patterns include a peak fluctuation pattern, a normal fluctuation pattern and a vertical fluctuation pattern. These fluctuation patterns are represented by the time-series data of traffic. Hereinafter, the fluctuation patterns will be referred to as "waveforms". That is, a peak-shaped fluctuation pattern will be called a peak waveform, a normal fluctuation pattern will be called a normal waveform, and a vertical fluctuation pattern will be called a vertical waveform.

The peak waveform setting unit 63 generates a peak waveform based on the performance time-series data, and records the generated peak waveform in the waveform recording unit 12. The normal waveform setting unit 62 generates a normal waveform based on the performance time-series data and the normal fluctuation recorded in the normal fluctuation recording unit 13, and records the generated normal waveform to the waveform recording unit 12. The vertical waveform setting unit 61 generates a vertical waveform based on the performance time-series data, and records the generated vertical waveform to the waveform recording unit 12.

The waveform decomposition unit 7 optimizes the peak waveform, the normal waveform, and the vertical waveform so as to approximate the fluctuation in the anomalous fluctuation interval shown by the performance time-series data with a fluctuation pattern that combines the peak waveform, the normal waveform, and the vertical waveform recorded in the waveform recording unit 12 (i.e., composite waveform). That is, the peak waveform, the normal waveform, and the vertical waveform of the waveform recording unit 12 are updated so as to approximate the performance time-series data precisely. At this time, the waveform decomposition unit 7 receives, from the log aggregation unit 2, the performance time-series data of the fluctuation in traffic in the anomalous fluctuation interval to the URLs extracted by the session separation unit 5, and approximates the fluctuation in traffic shown by this performance time-series data with the composite waveform.

The session duration testing unit 8 calculates, based on the log data of the web access log recording unit 10, the duration of accesses started in respective partial intervals obtained by dividing the anomalous fluctuation interval. The session duration testing unit 8 calculates the access duration for each partial interval obtained by, for example, dividing the anomalous fluctuation interval at the peak of the peak waveform set by the peak waveform setting unit 63. The session duration testing unit 8 notifies the calculated access durations to the event determination unit 9.

The event determination unit 9 determines the type of event that caused the anomalous fluctuation in the anomalous fluctuation interval, based on the peak waveform, the normal waveform, and the vertical waveform recorded in the waveform recording unit 12, the access durations calculated by the session duration testing unit 8, and rules prerecorded in the rule recording unit 11. The rules prerecorded in the rule recording unit 11 include, for example, data showing the relation between the type of event type and the composition of the peak waveform, normal waveform and vertical waveform, and the relation between the type of event and the session duration. The event type determined by the event determination unit 9 is output as the processing result. The event determination unit 9 may also include in the output processing result the anomalous fluctuation interval extracted by the deviation testing unit 3 and the URLs extracted by the session separation unit 5, for example. The processing result is output to a file, a display, or a printer (not shown), for example.

The event type estimation system 1 is built on a computer such as a server machine, a personal computer or a work station. The log aggregation unit 2, the deviation testing unit 3, the composition ratio increment testing unit 4, the session separation unit 5, the waveform setting unit 6, the waveform decomposition unit 7, the session duration testing unit 8, the event determination unit 9, the normal fluctuation generation unit 14 and the reference fluctuation generation unit 15 of the event type estimation system 1 may each be configured on a single computer or dispersed among a plurality of computers. The respective functions of the log aggregation unit 2, the deviation testing unit 3, the composition ratio increment testing unit 4, the session separation unit 5, the waveform setting unit 6, the waveform decomposition unit 7, the session duration testing unit 8, the event determination unit 9, the normal fluctuation generation unit 14 and the reference fluctuation generation unit 15 are implemented as a result of the CPU of the computer(s) executing prescribed programs. Consequently, computer programs for executing the above functions and recording media having these programs recorded thereon are also embodiments of the present invention. The rule recording unit 11, the waveform recording unit 12, the normal fluctuation recording unit 13 and the reference fluctuation recording unit 16 are realized by recording media such as a memory or hard disk provided in the computer(s).

Figure 2:
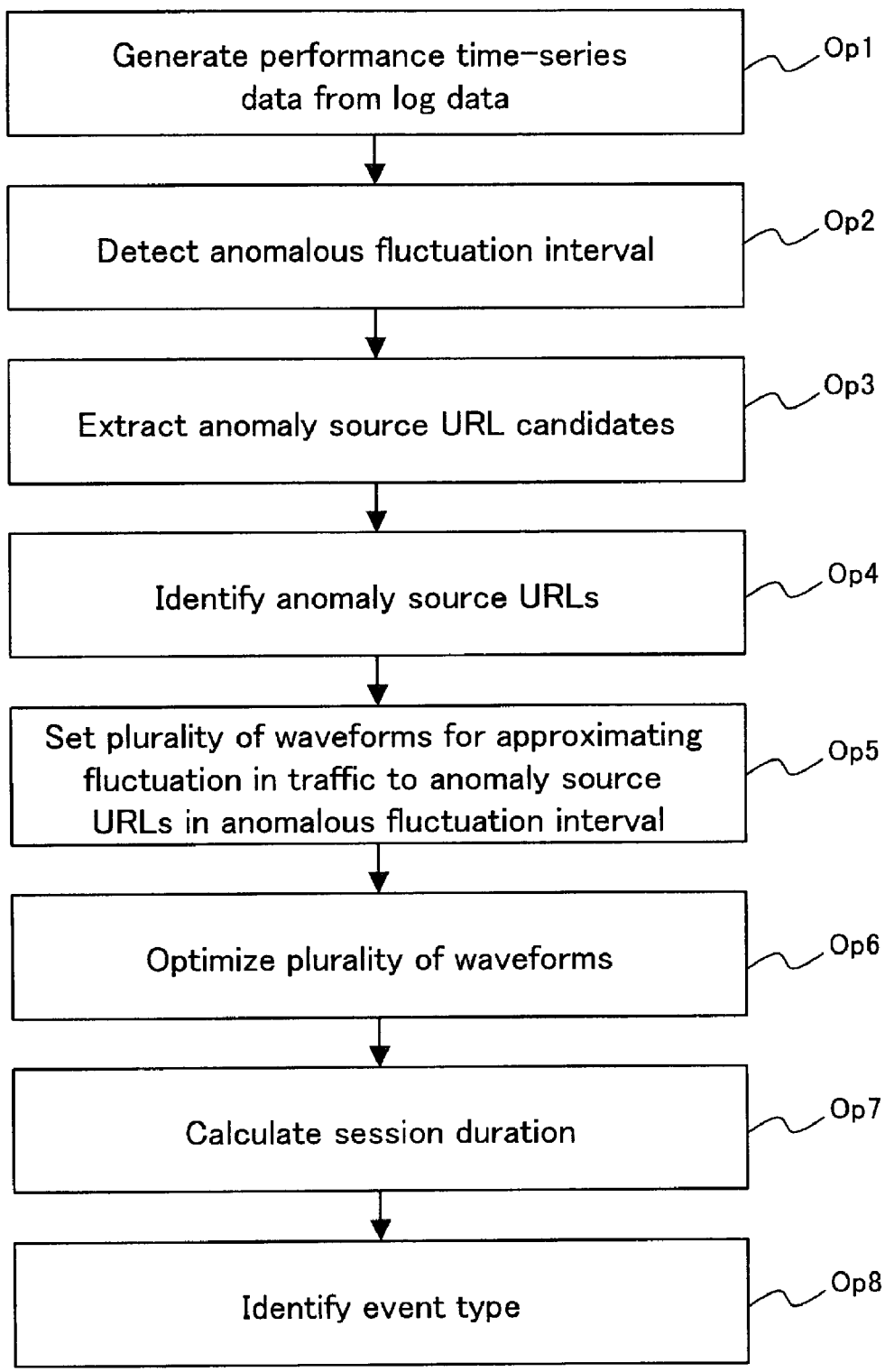
FIG. 2 is a flowchart showing exemplary operations of the event type estimation system.

Exemplary operations of the event type estimation system 1 will be described next. FIG. 2 is a flowchart showing exemplary operations of the event type estimation system. Hereinafter, the operations shown in FIG. 2 will be described in detail.

Op. 1: Processing of the Log Aggregation Unit 2

As shown in FIG. 2, firstly, the log aggregation unit 2 reads the log data recorded in the web access log recording unit 10, and generates performance time-series data representing the fluctuation in traffic to a website (Op. 1). Log data showing access history from user terminals to at least one website provided by a web server or the like, for example, is recorded in the web access log recording unit 10. Here, the case where the log data is a HTTP (HyperText Transfer Protocol) log will be described as an example. Typically, the HTTP log of a website is generated as a log file by the web server that provides the website. The HTTP log may also record access history to a plurality of websites. Note that since a single website is typically constituted by a plurality of services, a plurality of URLs (Uniform Resource Locators) exist for each website.

The log aggregation unit 2 generates time-series data representing the fluctuation in traffic to the website, from the read HTTP log. Traffic to a website is represented, for example, by the page view count, the session count or the session start count. The page view count is the number of views from user terminals to the main pages constituting a website. A session is a sequence of consecutive accesses from the same user terminal (same host). That is, a series of accesses from the same user terminal is treated as a single session. Note that in the case where the interval between accesses from the same user terminal is greater than a fixed time period (e.g., 30 min), subsequent accesses are viewed as a different session from accesses prior to the fixed period. Generally, the HTTP log records information relating to one access per line. In this case, a session ID identifying the session of that access is sometimes assigned to the line. The session count is the number of unique sessions within a prescribed period. The session count can, for example, be acquired by counting the number of unique session IDs within a prescribed period in the HTTP log. The session start count is the number of sessions newly started within a prescribed period. Note that the page view count, the session count and the session start count is exemplary data representing traffic, and that data representing traffic is not limited to this.

The log aggregation unit 2 aggregates the page view count, the session count, and the session start count at ten minute intervals, for example, based on the number of log lines in the HTTP log, and generates data arranged in time series as time-series data. In this case, the time-series data includes data representing the respective time-series fluctuations of the page view count, the session count, and the session start count. Note that the time-series data is not limited to this. For example, the time-series fluctuations of the total value or the average value of the page view count, the session count, and the session start count can also be taken as the time-series data.

Figure 3:
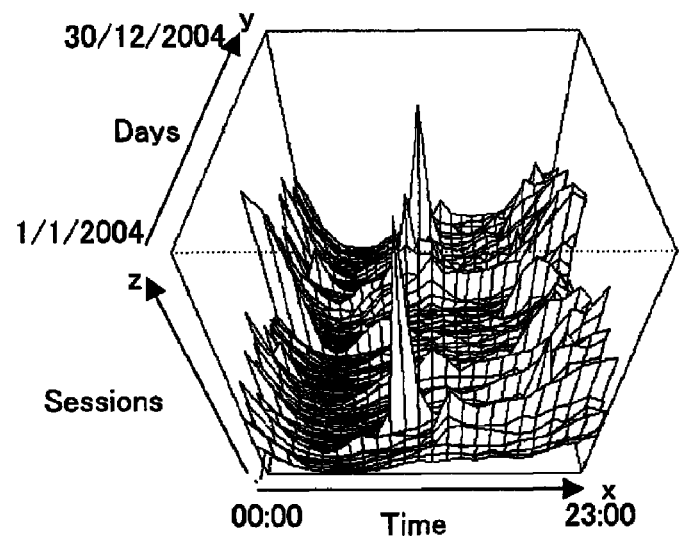
FIG. 3 uses three dimensional coordinates to represent time-series data generated by a log aggregation unit.

FIG. 3 uses three dimensional coordinates to represent an exemplary fluctuation of the session count shown by time-series data generated by the log aggregation unit 2. With the three dimensional coordinates shown in FIG. 3, the x axis represents time (00:00 to 23:00), the y axis represents days (1/1/2004 to 31/12/2004), and the z axis represents the session count. In the example shown in FIG. 3, a line representing the fluctuation in the session count from 00:00 hrs to 23:00 hrs is displayed for each day during the period from 1/1/2004 to 31/12/2004. Note that apart from the session count, the time-series data of the fluctuation in traffic for the page view count or the session start count can be represented with three dimensional coordinates, similarly to FIG. 3.

Op. 2: Processing of the Deviation Testing Unit 3

Next, the deviation testing unit 3 extracts from the performance time-series data an interval (i.e., anomalous fluctuation interval) showing anomalous fluctuation that deviates significantly from the reference fluctuation (Op. 2 in FIG. 2). An interval showing anomalous fluctuation is very likely an interval in which the fluctuation in traffic to the website is caused by an event, where traffic to the website increases sharply, for example. The interval showing anomalous fluctuation may be extracted in units of days or in units of hours or minutes. The units in which the anomalous fluctuation interval is extracted may, for example, be recorded in the reference fluctuation recording unit 16. Hereinafter, processing in the case where the anomalous fluctuation interval is extracted in units of days (i.e., "anomalous days" extracted as anomalous fluctuation intervals) will be described as an example.

Firstly, the reference fluctuation generation unit 15 calculates the reference fluctuation and records the calculated reference fluctuation in the reference fluctuation recording unit 16. The reference fluctuation generation unit 15 firstly derives averages $\mu_1$, $\mu_2$ and $\mu_3$, and variances $\sigma_1^2$, $\sigma_2^2$ and $\sigma_3^2$ every hour for 1 day (24 hours), with respect to the three types of time-series fluctuations page view count, session count, and session start count. In the case where the average $v_1$ of the page view count is derived for a certain timeslot (e.g., 1 pm-2 pm), the reference fluctuation generation unit 15 is able to calculate the average of the page view count for that timeslot (1 pm-2 pm) for the past several months by referring to the log data, and take this value as the average $\mu_1$. The averages $\mu_2$ and $\mu_3$ of the session count and the session start count can also be similarly calculated. Values that reflect long-term trend fluctuations or seasonal fluctuations may also be used.

Next, the deviation testing unit 3 sets $\mu_1 \pm 2\sigma_1$, $\mu_2 \pm 2\sigma_2$ and $\mu_3 \pm 2\sigma_3$ as reference values, and marks the respective timeslots in which the page view count $\lambda_1$, the session count $\lambda_2$, and the session start count $\lambda_3$ exceed the reference values as anomalous timeslots. Hereinafter, a specific example of the process of marking anomalous timeslots will be shown with reference to FIG. 4.

Figure 4:
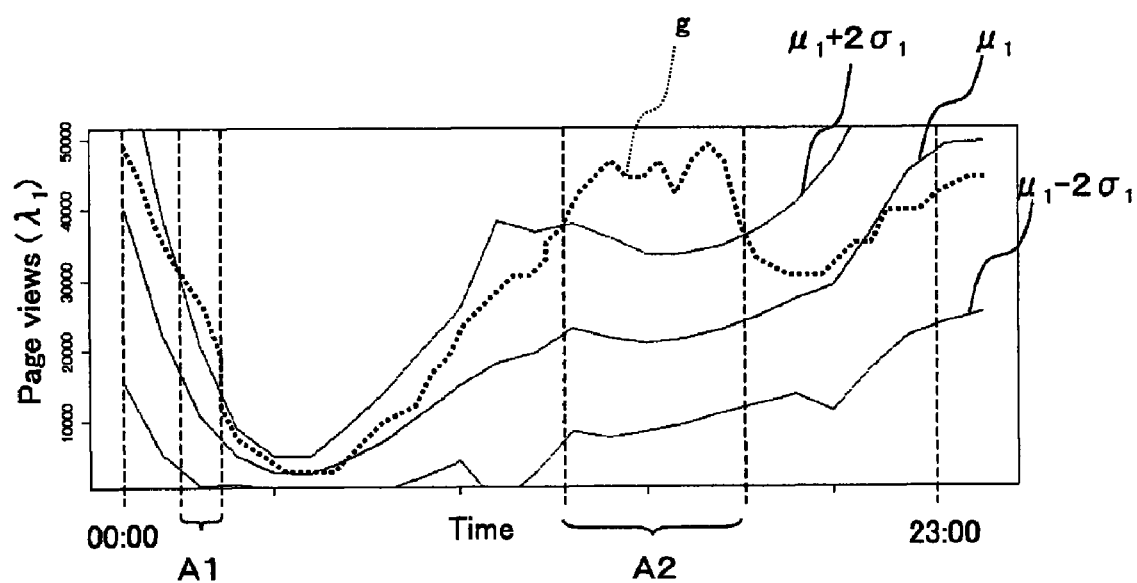
FIG. 4 is a graph representing exemplary averages $\mu_1$ and $\mu_1 \pm 2\sigma_1$ of a page view count.

FIG. 4 is a graph representing exemplary averages $\mu_1$ and $\mu_1 \pm 2\sigma_1$ of the page view count. In the graph shown in FIG. 4, the horizontal axis represents time and the vertical axis represents the page view count. The line g indicates an exemplary time-series fluctuation of the page view count $\lambda_1$ shown by the time-series data generated by the log aggregation unit 2. In the example shown FIG. 4, the deviation testing unit 3 marks the timeslots A1 and A2 in which the fluctuation in the page view count shown by the line g extends outside the area sandwiched between $\mu_1 + 2\sigma_1$ and $\mu_1 - 2\sigma_1$, as anomalous timeslots of the page view count.

Next, the deviation testing unit 3 respectively calculates $(\lambda_1 - \mu_1)/\sigma_1$, $(\lambda_2 - \mu_2)/\sigma_2$, $(\lambda_3 - \mu_3)/\sigma_3$ in the marked anomalous timeslots for the page view count, the session count and the session start count, and aggregates values obtained by multiplying the calculated values by respective weighted coefficients for a 24 hour period, for example. The respective values thus aggregated for the page view count, the session count and the session start count are set as deviations $\alpha 1$, $\alpha 2$ and $\alpha 3$. The deviation testing unit 3 is able to calculate the deviations $\alpha 1$, $\alpha 2$ and $\alpha 3$ for each day, in relation to the page view count, the session count, and the session start count, by repeatedly calculating the deviations for each interval (i.e., day) shown by the time-series data. The deviation testing unit 3 then extracts any days in which any of the deviations $\alpha 1$, $\alpha 2$ and $\alpha 3$ exceed a prescribed threshold (e.g., 0.15) as anomalous days (i.e., intervals showing anomalous fluctuation).

Note that the process of extracting anomalous fluctuation intervals is not limited to the foregoing example. The deviation testing unit 3 may extract a day showing a difference exceeding a threshold value as an anomalous day by, for example, comparing the traffic on a given day with the average traffic for a seven day period immediately preceding the given day, or extract timeslots showing anomalous fluctuation by comparing the fluctuation in traffic during a given timeslot of one day with the average fluctuation in traffic of the same timeslot for a seven day period immediately preceding that day, for example. As another example, intervals showing anomalous fluctuation can also be extracted using the anomaly detection method disclosed in the forgoing non-patent document 1.

Op. 3: Processing of the Composition Ratio Increment Testing Unit 4

Once an interval showing anomalous fluctuation has been extracted, the composition ratio increment testing unit 4 extracts, as anomaly source URL candidates, the URLs of the page or set of pages to which the increase in traffic in the anomalous fluctuation interval is particularly marked, out of the fluctuation in traffic shown by the performance time-series data (Op. 3 in FIG. 2). The composition ratio increment testing unit 4 is able to extract anomaly source URL candidates by comparing traffic in the anomalous fluctuation interval with traffic in a fixed period prior to the anomalous fluctuation interval. Hereinafter, a specific example of the process of extracting anomaly source URL candidates to which the increase in traffic is particularly marked on an anomalous day will be described in the case where anomalous days are extracted as anomalous fluctuation intervals by the deviation testing unit 3.

The composition ratio increment testing unit 4 refers to the HTTP log of the anomalous day extracted by the deviation testing unit 3, and extracts the top N number of URLs that appear frequently. The composition ratio increment testing unit 4 calculates, for each of the N URLs, what proportion of the traffic for the entire anomalous day is occupied by traffic to each of the URLs (composition ratio A). Further, the composition ratio increment testing unit 4 refers to the HTTP log for one week from the day prior to the anomalous day, and calculates the traffic to each of the N URLs for the week. If there is another anomalous day during week prior to the anomalous day, traffic preferably is calculated for a one week (7 day) period excluding that anomalous day. The composition ratio increment testing unit 4 then calculates what proportion of the traffic for the entire week is occupied by traffic to each of the N URLs during the one week period (composition ratio B).

Next, the composition ratio increment testing unit 4 calculates, for each of the N URLs, a composition ratio increment J representing the increment in the composition ratio, from the composition ratios A and B. The composition ratio increment J can be obtained, for example, by dividing composition ratio A by composition ratio B (i.e., J=A/B). A group of URLs whose composition ratio increment J is greater than a threshold is extracted from the N URLs by the composition ratio increment testing unit 4 as the anomaly source URL candidates. Alternatively, a group of M URLs having the highest composition ratio increments J out of the N URLs may be extracted as the anomaly source URL candidates. Note that the process of extracting anomaly source URL candidates is not limited to the foregoing example. For example, at least one of the page view count, the session count and the session start count can be used as the traffic.

Op. 4: Processing of the Session Separation Unit 5

The anomaly source URL candidates extracted by the composition ratio increment testing unit 4 may also include, for instance, URLs displayed simultaneously in the frame of a page that were simply refreshed when the user viewed the top page of the site. These URLs, having not experienced a real increase in visitors, do not contribute to the anomalous fluctuation. In view of this, the session separation unit 5 extracts the URLs of pages that contribute to the anomalous fluctuation component resulting from actual visitors caused by an event, by separating and analyzing the traffic of sessions that include accesses to pages characteristic of an event.

Once anomaly source URL candidates have been extracted by the composition ratio increment testing unit 4, a set of URLs highly likely to contribute to the anomalous fluctuation in traffic is identified out of the anomaly source URL candidates as anomaly source URLs by the session separation unit 6 (Op. 4 in FIG. 2). In order to identify anomaly source URLs, the session separation unit 5 receives from the page log aggregation unit 21 of the log aggregation unit 2, page fluctuation data showing the fluctuation in traffic of the session group that includes accesses during the interval to specific pages within the website. Traffic is represented, for example, by the page view count, the session count or the session start count. The session separation unit 5 compares the performance time-series data showing the fluctuation in traffic for the website as a whole with a composite fluctuation obtained by superimposing the fluctuation in traffic under normal conditions during the anomalous fluctuation interval onto the fluctuation in traffic of the session group that includes accesses to the specific pages shown by the received page fluctuation data, and calculates the error.

Here, the fluctuation in traffic under normal conditions is the fluctuation under normal conditions when not affected by events or the like, and is recorded in the normal fluctuation recording unit 13. The normal fluctuation generation unit 14 generates the fluctuation in traffic under normal conditions using the log data acquired via the log aggregation unit 2, and records the generated fluctuation in the normal fluctuation recording unit 13. For example, the normal fluctuation generation unit 14 is able to acquire time-series data representing the fluctuation in traffic for each day of the past year, and set time-series data obtained by averaging the acquired time-series data for each day as the fluctuation in traffic under normal conditions for one day. Note that the fluctuation in traffic under normal conditions is not necessarily limited to being calculated based on log data. For example, a prerecorded fixed value may be recorded in the normal fluctuation recording unit 13 as the fluctuation in traffic under normal conditions, or the normal fluctuation generation unit 14 may generate data showing the average fluctuation from the performance time-series data generated by the log aggregation unit 2, and record the generated data in the normal fluctuation recording unit 13.

The session separation unit 5 calculates, in relation to various pages or sets of pages within the website, the error between the time-series data showing the fluctuation in traffic for the website as a whole and the composite fluctuation obtained by superimposing the fluctuation in traffic under normal conditions onto the fluctuation in traffic of the session group that includes accesses to the pages or sets of pages. The session separation unit 6 identifies the URLs of the page or set of pages with the smallest error as the anomaly source URLs. URLs highly likely to contribute to the anomalous fluctuation in traffic are thereby identified as anomaly source URLs. As a result, the component of traffic that fluctuates steadily with no connection to events can be excluded from the processing by the waveform decomposition unit 7 described below. Hereinafter, a specific example of the process of identifying anomaly source URLs by the session separation unit 5 will be described.

Firstly, the session separation unit 5 selects a partial set S from the set $S_{all}$ of URLs made up of the anomaly source URL candidates extracted by the composition ratio increment testing unit 4. In the case where ten URLs are included in the set $S_{all}$, for example, the session separation unit 5 randomly selects L number of URLs (L being an integer from 1 to 10) out of the set $S_{all}$ as the partial set S.

The session separation unit 5 then requests the page log aggregation unit 21 to separate the session count fluctuations aS of the session group that includes accesses to the L URLs on the anomalous day extracted by the deviation testing unit 3 from the session count fluctuations of the session group that does not include accesses to the L URLs, and aggregate the separated session count fluctuations aS. The page log aggregation unit 21 aggregates the session count fluctuations aS based on the log data, and notifies the result to the session separation unit 5.

The normal fluctuation generation unit 14 generates the fluctuation in the session count for one day under normal conditions, based on the performance time-series data aggregated by the log aggregation unit 2, and records the generated data in the normal fluctuation recording unit 13.

The session separation unit 5 is able to represent the performance values y of the session count fluctuation for the website as a whole on the anomalous day in the following equation 1, using the above aS, the session count fluctuation m for one day under normal conditions, a constant k and an error sequence e. Note that aS, m and e are represented by vectors, for example.

$$y = aS + k \cdot m + e \qquad (1)$$

Equation 1 is based on the idea that if the session count fluctuation aS of the session group that includes accesses to the L URLs is assumed to represent anomalous fluctuation resulting from an event, subtracting aS from the performance value y of the session count fluctuation for the website as a whole would be expected to give a fluctuation $k \cdot m$ that is proportional to the session count fluctuation m under normal conditions. That is, when aS contains a large component of the anomalous fluctuation resulting from an event, the model Y of the session count fluctuation represented by $Y = aS + k \cdot m$ would be expected to approximate the performance values y.

Figure 5:
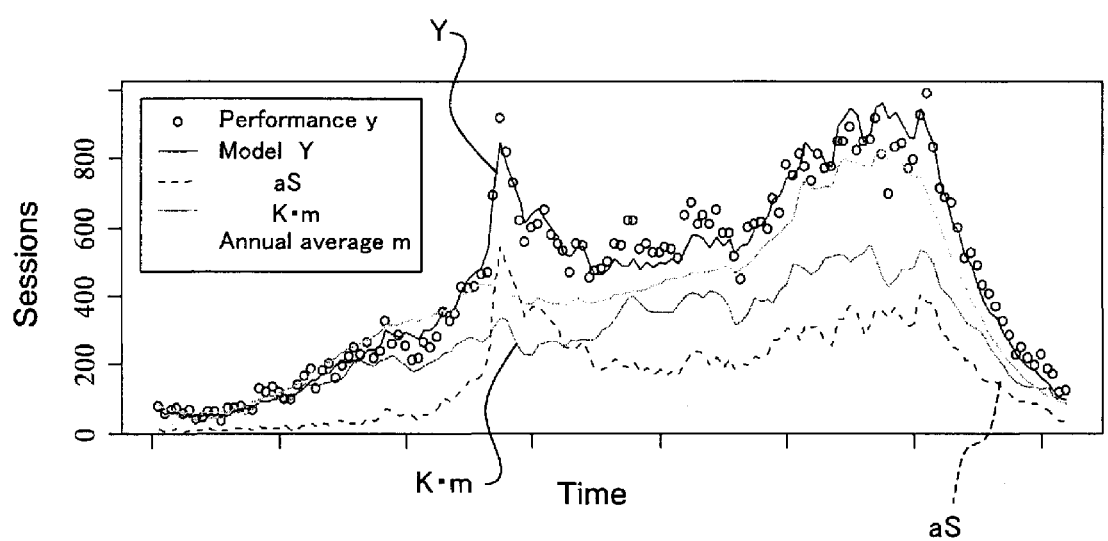
FIG. 5 is a graph representing examples of a model Y of access fluctuation, the session count fluctuation aS of a specific URL, steady fluctuation k·m and a performance value y.

FIG. 5 is a graph representing examples of Y, aS, $k \cdot m$ and performance values y. In the graph shown in FIG. 5, the vertical axis represents the session count and the horizontal axis represents time. Circler symbols "◯" plot the performance values y, and respective lines representing Y, aS and k·m are depicted in the graph. The graph shown in FIG. 5 is an example in which aS contains a large component of the anomalous fluctuation resulting from an event, and the model Y=aS+k·m of the session count fluctuation approaches the performance values y.

The session separation unit 5 performs the process of selecting the partial set S of L URLs from the set $S_{all}$ for the various combination of L URLs, and calculates the square sum of errors e in equation 1 for the respective combinations. The session separation unit 5 then identifies a partial set S* having the smallest square sum of errors e as the anomaly source URLs. That is, the session separation unit 5 extracts the partial set S* having the smallest square sum of errors e in equation 1 from the partial sets of URL set $S_{all}$, and identifies the L URLs included in the partial set S* as the anomaly source URLs. The component of anomalous fluctuation resulting from an event, from which normal fluctuation has been clearly separated, can thereby be extracted by the session separation unit. Note that equation 1 is a type of regression model.

Note that the process of identifying anomalous fluctuation URLs by the session separation unit 5 is not limited to the foregoing example. The page view count or the session start count may, for example, be used instead of the session count in the foregoing example.

The foregoing processing by the composition ratio increment testing unit 4 in Op. 3 and by the session separation unit 5 in Op. 4 is upstream processing for narrowing down the data to be processed by the waveform decomposition unit 7 (described below). If necessary, Op. 3 may be omitted, and the Op. 4 processing performed on all of the URLs as $S_{all}$. Further, if necessary, both Op. 3 and Op. 4 may be omitted, and the Op. 5 processing performed with all of the URLs viewed as anomaly source URLs.

Note that in the case where the composition ratio increment testing unit 4 is used in combination with and upstream of the session separation unit 5 as in the present embodiment, the session separation unit 5 derives the extent to which pages contribute to anomalous fluctuation, targeting pages to which the increase in accesses has been particularly marked. The amount of calculations in the session separation unit 5 is reduced in comparison to when processing is performed in relation to the fluctuation in traffic to all of the pages contained in a website.

Op. 5: Processing of the Waveform Setting Unit 6

Once the partial set S* of anomaly source URLs has been identified by the session separation unit 5, the waveform setting unit 6 requests the page log aggregation unit 21 to aggregate the fluctuations in traffic of the session group that includes accesses to the partial set S* of anomaly source URLs. The page log aggregation unit 21 aggregates the fluctuations in traffic of the session group that includes accesses to the partial set S* of anomaly source URLs based on the log data, and notifies the result to the waveform setting unit 6 as performance time-series data. Traffic is represented, for example, by the page view count, the session count or the session start count. The waveform setting unit 6 sets a plurality of waveforms for approximating the fluctuation in traffic of the session group that includes accesses to the anomaly source URLs (Op. 5 in FIG. 2). The plurality of waveforms includes a peak waveform, a normal waveform and a vertical waveform.

The peak waveform is represented by the time-series data of a fluctuation pattern in which traffic in all or part of the anomalous fluctuation interval exhibits an increasing tendency over time from a start time point and, on reaching a time point defining a peak, exhibits a decreasing tendency to an end time point. Note that traffic in the interval of the peak waveform up to the peak does not necessary increase monotonically, and there may be intervals that fall locally. Similarly, in the interval after the peak in which traffic decreases there may be intervals that increase locally.

The normal waveform is represented by the time-series data of a fluctuation pattern, in the anomalous fluctuation interval, of traffic under normal conditions without anomalous fluctuation.

The vertical waveform is represented by the time-series data of a fluctuation pattern in which traffic increases or decreases in an interval of part of the anomalous fluctuation interval. The vertical waveform includes rising and falling waveforms. A rising waveform is a fluctuation pattern that, for example, rises stepwise at certain time point. A falling waveform is a fluctuation pattern that, for example, falls stepwise at a certain time point.

Figure 6:
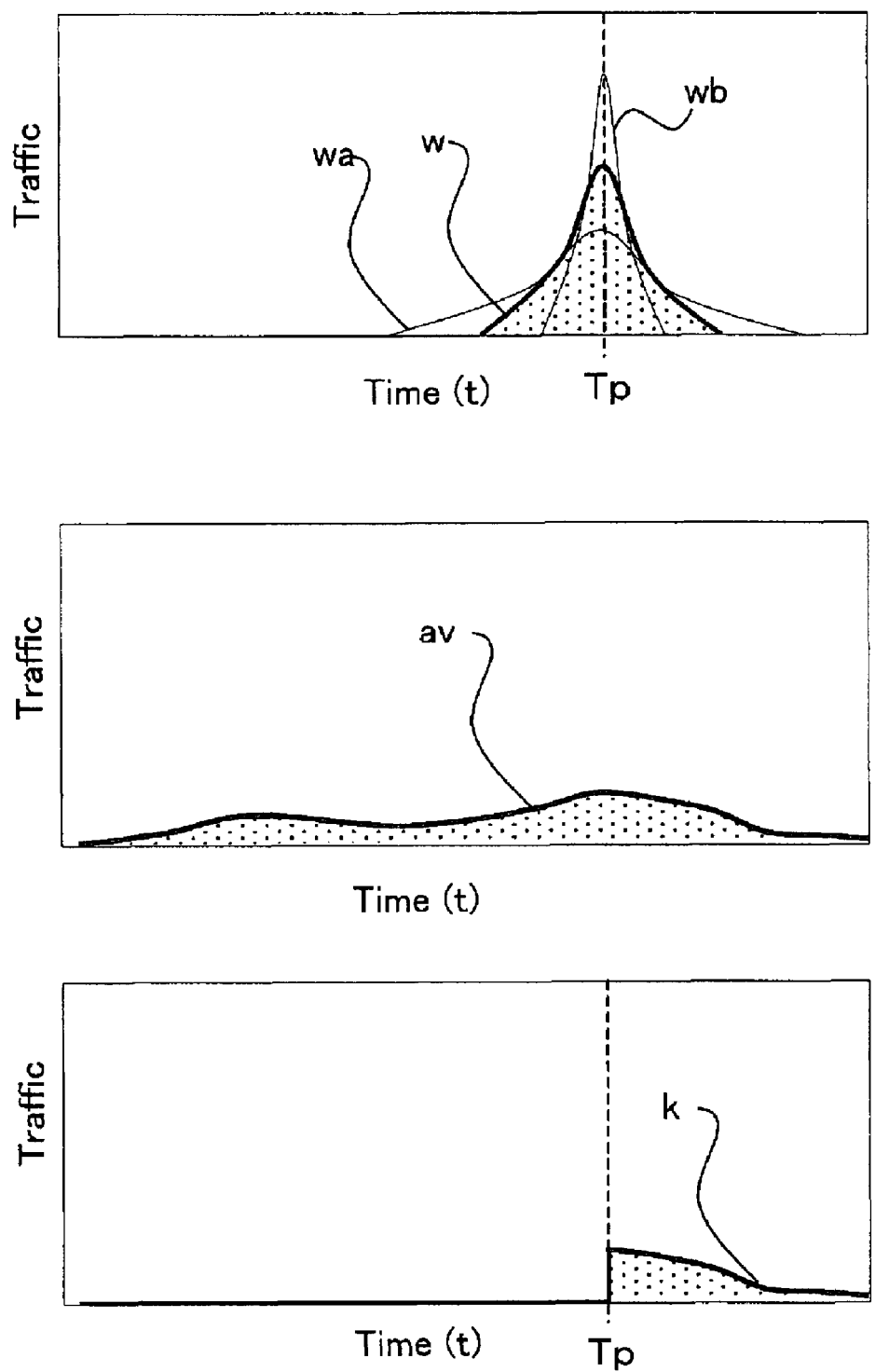
FIG. 6 shows examples of a peak waveform, a normal waveform representing steady fluctuation, and a rising waveform that rises stepwise on reaching a certain time point.

Hereinafter, a specific example of the processing by the waveform decomposition unit 7 will be described. The following specific example involves the case where the deviation testing unit 3 has extracted an anomalous day as the interval showing anomalous fluctuation (i.e., extraction performed in units of days). FIG. 6 shows examples of a peak waveform, a normal waveform representing steady fluctuation, and a rising waveform that rises stepwise on reaching a certain time point. In the top, middle and bottom graphs shown in FIG. 6, the horizontal axis represents time for one day (00:00 to 23:59), and the vertical axis represents traffic. The top graph of FIG. 6 shows an exemplary peak waveform set by the peak waveform setting unit 63. The line w represents a peak waveform with a peak at Tp. In the present embodiment, the case where the peak waveform is represented by the density function logis(t) of a logistic distribution will be described as an example. The density function logis(t) of the logistic distribution is represented by the following formula 1.

$$logis(t) = \frac{e^{-\frac{t-Tp}{s}}}{s(1+e^{-\frac{t-Tp}{s}})^2} \quad \text{(formula 1)}$$

In formula 1, s is the steepness, and Tp is the time point Tp at which waveform peaks. With the density function of the logistic distribution shown in formula 1, the integral from negative infinity to positive infinity will be 1. When s is decreased in the density function of the logistic distribution, or in other words, when the curve represented by the density function of the logistic distribution has a steep peak, the height of the peak increases to keep the area at 1. Conversely, when s is increased, or in other words, when the peak of the curve represented by the density function of the logistic distribution has a gentle peak, the height of the peak decreases to keep the area at 1. The top graph of FIG. 6 shows peak waveforms in the case where the steepness s of the density function logis(t) of the logistic distribution shown by the lines wa, wb and w is varied.

The peak waveform setting unit 63 determines the steepness s and the time point Tp of the peak of the density function of the logistic distribution based on the performance time-series data. For example, the peak waveform setting unit 63 calculates the steepness s and the time point Tp of the peak according to the peak-shaped fluctuation pattern that appears in the fluctuation in traffic during the anomalous fluctuation interval shown by the performance time-series data. Hereinafter, an example of the process of calculating the position of the peak of a peak waveform will be described.

Let a performance time series representing the fluctuation in traffic on an anomalous day for a session group that includes accesses to anomaly source URLs identified by the session separation unit 5 and represented by the performance time-series data be event(t), and let an average time series that takes the annual average of the daily fluctuation in traffic be ave(t). The peak waveform setting unit 63 calculates a substantive time series obtained by dividing the performance time series by the average time series [event(t)/ave(t)]. The peak waveform setting unit 63 is able to determine the time point at which traffic is greatest in this substantive time series as a peak time point Tp. Alternatively, the peak waveform setting unit 63 may set the peak time point to N number of values by taking the top N time points at which traffic is greatest as peak time points Tp.

Once the peak time point has been determined, the peak waveform setting unit 63 may determine the steepness s based on the degree of increase in traffic in the substantive time series prior to the peak time point Tp and the degree of decrease in traffic after the peak time point Tp. The steepness s may also be set to M number of values, similarly to the peak time point. Note that when the peak time point Tp is set to N values and the steepness s is set to M values, logis(t) representing the peak waveform will be set to N×M patterns. In this case, the waveform decomposition unit 7 is able to perform an optimization process (described below) for each of the N×M peak waveforms, and derive the steepness and the peak time point of the peak waveform for which the best results were obtained.

Note that the method of determining the steepness and the peak time point of a peak waveform is not limited to the foregoing example. The density function of a logistic distribution is an exemplary function representing a peak waveform, and the peak waveform is not limited to the density function of a logistic distribution. For example, the density function of a normal distribution may be used.

The middle graph of FIG. 6 shows an exemplary normal waveform representing the fluctuation in traffic under normal conditions. The line av represents the normal waveform. The normal waveform setting unit 62 is able to generate the normal waveform based on the fluctuation in traffic under normal conditions recorded in the normal fluctuation recording unit 13. The normal waveform setting unit 62 generates, as the normal waveform, a time-series function average(t) in which a time series obtained by averaging the daily fluctuation in traffic for one year, for example, is normalized to give a total of 1.

The bottom graph of FIG. 6 shows an exemplary rising waveform. The line k represents the rising waveform. The vertical waveform setting unit 61 is able to set, as a rising waveform, a time-series function part(t) in which the portion of average(t) shown by the line av before the peak time point Tp of the peak waveform shown by the line w is set to zero, as shown by the line k.

Note that a falling waveform can be represented by the difference between the function average(t) representing the normal waveform and the function part(t) representing the rising waveform [average(t)−part(t)]. Hereinafter, the case where only a rising waveform is used will be described.

The method of setting a rising waveform and a falling waveform is not limited to the foregoing example. For example, the vertical waveform setting unit 61 may generate a rising waveform or a falling waveform according to the fluctuation in traffic on an anomalous day represented by performance time-series data. For example, the vertical waveform setting unit 61 may extract an interval that rises at a greater slope than a fixed value in the fluctuation in traffic on an anomalous day represented by performance time-series data, and generate a rising waveform according to the slope of the interval.

The place in a rising waveform or a falling waveform that rises or falls stepwise need not necessarily change vertically, as with the line k. For example, the rising or falling portion may slope to a certain extent or includes a plurality of steps.

Op. 6: Processing of the Waveform Decomposition Unit 7

Once the peak waveform, the normal waveform and the vertical waveform have been generated by the waveform setting unit 6 and recorded in the waveform recording unit 12, the waveform decomposition unit 7 generates a composite waveform obtained by superimposing waveforms obtained by multiplying each of these waveforms by a coefficient, and calculates the squared error between this composite waveform and the fluctuation in traffic of the session group that includes accesses to the anomaly source URLs, shown by the performance time-series data. The waveform decomposition unit 7 calculates the coefficients of the waveforms having the smallest squared error. The peak waveform, the normal waveform, and the vertical waveform are thereby optimized so that the composite waveform approximates the fluctuation in traffic shown by the performance time-series data (Op. 6 in FIG. 2). In the present embodiment, the waveform decomposition unit 7 calculates the optimal values of the peak waveform, normal waveform and vertical waveform components in order to approximate the fluctuation in traffic of the session group that includes accesses to the anomaly source URLs. Hereinafter, a specific example will be described.

Let the fluctuation in traffic on an anomalous day for a session group that includes accesses to anomaly source URLs identified by the session separation unit 5 and represented by the substantial time-series data be performance values y(t). The waveform decomposition unit 7 approximates the performance values y(t) with a composite waveform that combines the waveforms represented by the functions logis(t), average(t) and part(t). When the composite waveform is Y(t), the waveform decomposition unit 7 is able to calculate the composite waveform Y(t) that combines the functions logis(t), average(t) and part(t), using the coefficients a, b, c and d, as in the following equation 2, for example.

$$Y(t)=a*\text{logis}(t)+b*\text{average}(t)+c*\text{part}(t)+d \qquad (2)$$

In equation 2, the coefficients a, b and c respectively represent the components of the peak waveform, normal waveform, and vertical waveform. The waveform decomposition unit 7 performs regression analysis on Y(t) given by equation 2 using the performance values y(t), and calculates the coefficients a, b, c and d having the smallest squared error between Y(t) and the performance values y(t). The components of the peak waveform, normal waveform, and vertical waveform are thereby calculated. The waveform decomposition unit 7 notifies the calculated coefficients a, b and c to the event determination unit 9.

Figures 7, 8:
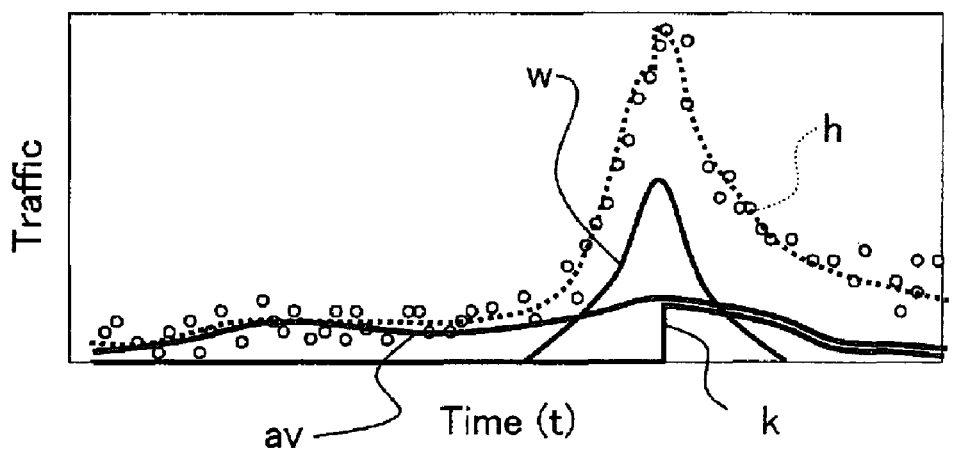
FIG. 7 is a graph showing examples of performance values and a composite waveform that combines the peak waveform, the normal waveform and the rising waveform.
FIG. 8 shows exemplary data representing rules recorded in a rule recording unit 11.

FIG. 7 is a graph showing examples of performance values and an exemplary composite waveform that combines the peak waveform, the normal waveform and the rising waveform. In the graph shown in FIG. 7, the horizontal axis represents time and the vertical axis represents traffic. Circler symbols "○" plot the performance values y(t). The lines, w, av and k respectively show waveforms represented by the functions logis(t), average(t) and part(t) shown in FIG. 6. The line h shows a composite waveform (Y(t)) that combines the waveforms represented by these three functions.

Note that in the case where the peak waveform setting unit 63 sets the function logis(t) of N×M peak waveforms made up of combinations of N peak time points and M steepness values, for example, the waveform decomposition unit 7 may perform regression analysis using equation 2 in relation to each of the N×M patterns of the function logis(t), and select the optimum function logis(t). In this case, the waveform decomposition unit 7 notifies the peak time point Tp and the steepness s in the function logis(t) of the optimum peak waveform to the event determination unit 9, together with values representing the respective waveform components (the above coefficients a, b, c, d).

Note that the process of optimizing the peak waveform, normal waveform, and vertical waveform is not limited to the foregoing example. Although regression analysis is used in the foregoing example, the peak waveform, normal waveform, and vertical waveform can also be optimized by alternatively using a genetic algorithm or the Monte Carlo method, for example.

Op. 7: Processing of the Session Duration Testing Unit 8

The session duration testing unit 8 calculates the distribution of session durations for the respective timeslots of the portion of the peak waveform calculated by the waveform decomposition unit 7 before the peak (hereinafter, pre-peak portion) and the portion after the peak (hereinafter, post-peak portion) (Op. 7 of FIG. 2). The session duration is the time period from the start to the end of a session, which is a series of accesses by the same user terminal.

The session duration testing unit 8 separately acquires, via the log aggregation unit 2, data showing the session duration of all sessions started in the pre-peak portion and data showing the session duration of all sessions started in the post-peak portion. The acquired data showing the session durations is notified to the event determination unit 9. Note that the session duration testing unit 8 may also calculate the distribution of the respective session durations for the timeslot prior to the start time point of the peak waveform and the timeslot after the end time point of the peak waveform.

Op. 8: Processing of the Event Determination Unit 9

The event determination unit 9 identifies the type of event that caused the anomalous fluctuation seen in the above fluctuation interval, based on the values showing the peak waveform, normal waveform and vertical waveform components calculated by the waveform decomposition unit 7 and the rules recorded in the rule recording unit 11 (Op. 8 in FIG. 2). The rules recorded in the rule recording unit 11 represent the relation between types of events and the composition of the components, for example.

Exemplary rules include: "If rising waveform markedly evident, then internal event"; "If rising waveform not evident, then external event"; "If rising waveform and peak waveform evident, then advertised event"; "If rising waveform evident but not peak waveform, then non-advertised event". These rules can be derived based on rules of thumb. The above rule can be derived from the rule of thumb such as that for example, if an event such as a web campaign is carried out within the site, a rising waveform should be evident from the event start time, or on the other hand, if there is an external event such as street advertising or a concert, a rising waveform would not be expected.

FIG. 8 shows exemplary data representing rules recorded in the rule recording unit 11. In the example shown in FIG. 8, data showing conditions of the composition of the components of the peak waveform, normal waveform and vertical waveform, and the types of events identified when these conditions are satisfied are recorded in association with each other as rules. The composition of the components of the peak waveform, normal waveform and vertical waveform can be represented using the coefficients a, b and c in the above equation 2, for example.

In the example shown in FIG. 8, the condition "rising waveform not evident" is given by the equation $(c/b) > C_{max}$, using the coefficient c of the function part(t) of the rising waveform and the coefficient b of the function average(t) of the normal waveform in equation 2, and a constant $C_{max}$ representing a threshold. Similarly, the condition "rising waveform and peak waveform evident" is represented by "$(c/b) > C_{ave}$, $(a/b) > A_{ave}$", using the coefficients a, b and c in equation 2, and constants $C_{ave}$ and $A_{ave}$ representing thresholds. Note that data representing the rules in not limited to the data shown in FIG. 8.

The event determination unit 9 is able to identify event type by determining whether the coefficients a, b and c notified by the waveform decomposition unit 7 satisfy the conditions of the rules recorded in the rule recording unit 11. For example, the event determination unit 9 refers to the rules shown in FIG. 8, and if the coefficients b and c notified by the waveform decomposition unit 7 satisfy the relation $(c/b) > C_{max}$, the event determination unit 9 determines that the event is an internal event. Further, if the coefficients a, b and c satisfy $(c/b) > C_{ave}$ and $(a/b) > A_{ave}$, the event determination unit 9 determines that the event was advertised. In this case, the event type identified by the event determination unit 9 is "advertised internal event".

Thus, the event determination unit 9 is able to judge whether an event that caused the anomalous fluctuation evident in the interval extracted by the deviation testing unit 3 is an internal event (in-site event) or an external event (external-site event), based on the rising waveform calculated by the waveform decomposition unit 7. The event determination unit 9 is also able to judge whether the event that caused the anomalous fluctuation was advertised, based on the peak waveform and the rising waveform calculated by the waveform decomposition unit 7. With conventional web log analysis tools, even if anomalous fluctuation was detected, it was not possible to identify whether the event that caused the anomalous fluctuation was internal or external, or whether it was an advertised event. With the event type estimation system 1, this becomes possible as a result of the above processing performed by the event determination unit 9 using the results of the waveform decomposition unit 7.

Another example of a rule recorded in the rule recording unit 11 is, "If average session duration of sessions started in pre-peak portion of peak waveform is greater than average session duration of sessions started in post-peak portion of peak waveform by greater than a prescribed period, then accesses mainly to people-oriented services such as BBSs, but if it is not so, then accesses mainly to information providing services."

The event determination unit 9 is able to identify event type by applying these rules to the session durations calculated by the session duration testing unit 8. That is, event estimation utilizing the characteristics of session duration becomes possible as a result of the event determination unit 9 comparing the characteristics of the session duration distribution for respective timeslots divided at the peak time point of the peak waveform calculated by the peak waveform setting unit 63. Note that with conventional techniques, event estimation utilizing differences in the session duration of sessions in the pre-peak and post-peak portions of a peak waveform was not possible, even if session duration distributions could be aggregated.

Note that the method of determining the foregoing event types and the rules shown in FIG. 8 are by way of example, and the method of determining event types and rules is not limited to this. For example, steepness and the peak time point of the peak waveform may be included in the rules.

Embodiment 2

In the present embodiment, the waveform decomposition unit 7 of the first embodiment includes further functions. The waveform decomposition unit 7 according to the present embodiment further performs a new process if a favorable result is not obtained after performing a process corresponding to Op. 5 of the first embodiment. The processing of the function blocks other than the waveform decomposition unit 7 is similar to the first embodiment.

A plurality of peaks sometimes occur in the fluctuation in traffic resulting from a single event, such as when traffic peaks at the start and end of an event, for example. If this kind of fluctuation in traffic is applied as the performance values y(t) used in the processing of the waveform decomposition unit 7, it could happen that even if the waveform decomposition unit 7 calculates the coefficients a, b, c and d having the smallest squared error between the composite waveform Y(t) given by equation 2 and the performance values y(t), this squared error may not be smaller than the fixed value.

In view of this, if the error between the composite waveform Y(t) given by equation 2 and the performance values y(t) is greater than a prescribed value, the waveform decomposition unit 7 of the present embodiment changes the plurality of waveforms constituting the composite waveform Y(t), and performs the calculation to approximate the performance values y(t) using a different composite waveform. That is, the peak waveform setting unit 63 generates a peak waveform representing a peak-shaped fluctuation pattern in each of two different intervals within the anomalous fluctuation interval. A first peak waveform and a second peak waveform are thereby recorded in the waveform recording unit 12. The waveform decomposition unit 7 optimizes the first peak waveform, the second peak waveform, the normal waveform and the vertical waveform, so as to approximate the performance values y(t) with a composite waveform that combines the first peak waveform, the second peak waveform, the normal waveform, and the vertical waveform.

The waveform decomposition unit 7 is able to approximate the performance values y(t) more precisely in the case where fluctuation in which traffic peaks appear at two time points is shown in the interval extracted as an interval showing anomalous fluctuation, by thus approximating the performance values y(t) with a composite waveform that uses two peak waveforms.

FIG. 9 shows examples of a first peak waveform, a second peak waveform, a normal waveform representing steady fluctuation, and a vertical waveform that rises stepwise at the time point of the first peak and falls stepwise at the time point of the second peak. In the top, middle and bottom graphs shown in FIG. 9, the horizontal axis represents time and the vertical axis represents traffic. The top graph of FIG. 9 shows an exemplary first peak waveform. The line w-1 represents a peak waveform with a peak at Tp1. The second graph from the top in FIG. 9 shows an exemplary second peak waveform. The line w-2 represents a peak waveform with a peak at Tp2. Both the first and second peak waveforms are represented by the density function of logistic distributions, similarly to the first embodiment, these being logis1($t$) and logis2($t$). The third graph from the top in FIG. 9 is the same as the middle graph of FIG. 6, with the line av showing a normal waveform represented by the function average(t). The fourth graph from the top in FIG. 9 shows an exemplary vertical waveform that rises stepwise at the time point of the first peak and falls stepwise at the time point of the second peak. This vertical waveform can be represented by a time-series function part2($t$) in which the portions of average(t) shown by the line av before the first peak time point Tp1 and after the second peak time point Tp2 are set to zero, as shown by the line kk.

The waveform decomposition unit 7 again approximates the performance values y(t) with a composite waveform that combines the waveforms represented by the functions logis1($t$), logis2($t$), average(t) and part2($t$), in the case where the error between Y(t) calculated using equation 2 and the performance values y(t) is greater than a prescribed threshold. At this time, a composite waveform Y2($t$) is calculated using the following equation 3, for example.

$$Y2(t) = a1*\text{logis1}(t) + a2*\text{logis2}(t) + b*\text{average}(t) + c*\text{part2}(t) + d \qquad (3)$$

In equation 3, the coefficients a1, a2, b and c respectively represent the components of the first peak waveform, the second peak waveform, the normal waveform, and the vertical waveform. The waveform decomposition unit 7 performs regression analysis on Y2($t$) given by equation 3 using the performance values y(t), and calculates the coefficients a1, a2, b, c and d having the smallest squared error between the performance values y(t) and Y2($t$). The performance values y(t) can thereby be approximated by Y2($t$) precisely in the case where there are two peaks in traffic in the fluctuation in traffic shown by performance values y(t). Note that if the squared error between the performance values y(t) and Y2($t$) is less than a prescribed threshold even after having optimized Y2($t$), the waveform decomposition unit 7 may increase the number of peak waveforms by one and perform similar calculations.

While embodiments of the present invention have been described above in the first and second embodiments, the present invention is not limited to the foregoing embodiments. For example, the log data read by the event type estimation system 1 is not limited to being log data showing access history to a website, as in the foregoing embodiments. For example, the event type estimation system 1 may read log data showing access history to a server database of a service in which the database is viewed directly from user terminals provided in a network of limited range such as an intranet.

According to the present embodiment, it is possible to analyze the characteristics of past fluctuation patterns using only log data stored in a web server, without newly provided means for associating event information and log data, and to estimate the type of event that has occurred. For example, it is possible to determine whether access fluctuations were affected by scheduled events implemented within the site or events that occurred outside the site based on the past HTTP logs. Further, it is possible to accumulate data representing past fluctuations in traffic after classifying the data into event types. When scheduling a certain type of event, for example, it is thereby possible to use only the cases of fluctuations resulting from that type of scheduled event, out of the cases of past fluctuations in traffic, as a basis for forecasting.

The present invention is effective as a system capable of extracting access fluctuation anomalies from the log data of a site, and estimating the type of event that caused the anomalous fluctuation.

What is claimed is:

1. An event type estimation system including a processor comprising:
    a log aggregation unit implemented by the processor that reads log data showing access history from a user terminal to at least one site provided by a computer connected to a network, and outputs performance time-series data representing a fluctuation in traffic to the site based on the log data;

a deviation testing unit implemented by the processor that extracts, from the performance time-series data, an interval showing an anomalous fluctuation in which the fluctuation in traffic deviates from a recorded reference fluctuation;

a peak fluctuation pattern setting unit implemented by the processor that calculates a steepness and a time point of a peak that appears in the fluctuation in the traffic during all or part of the interval represented by the performance time-series data, generates peak fluctuation time-series data representing a fluctuation pattern that has the steepness and a peak at the time point and records the generated peak fluctuation time-series data in a fluctuation pattern recording unit;

a normal fluctuation pattern setting unit implemented by the processor that generates, based on the performance time-series data or prerecorded data, normal fluctuation time-series data representing a fluctuation pattern, in the interval extracted by the deviation testing unit, of traffic under normal conditions, and records the generated normal fluctuation time-series data in the fluctuation pattern recording unit;

a vertical fluctuation pattern setting unit implemented by the processor that generates, based on the performance time-series data, vertical fluctuation time-series data representing a fluctuation pattern in which traffic increases or decreases in an interval of part of the interval extracted by the deviation testing unit, and records the generated vertical fluctuation time-series data in the fluctuation pattern recording unit;

a waveform decomposition unit implemented by the processor that calculates optimal values of components of the fluctuation patterns respectively represented by the peak fluctuation time-series data, the normal fluctuation time-series data and the vertical fluctuation time-series data, so that a combination of the fluctuation patterns approximates the fluctuation in traffic represented by the performance time-series data;

a rule recording unit that records a rule showing a relation between a type of event that causes anomalous fluctuation and composition of the components of the fluctuation patterns respectively represented by the peak fluctuation time-series data, the normal fluctuation time-series data, and the vertical fluctuation time-series data; and an event determination unit implemented by the processor that determines a type of event that caused the anomalous fluctuation in the interval, based on the composition of the components shown by the rule recorded in the rule recording unit and the values of the components of the fluctuation patterns optimized by the waveform decomposition unit.

2. The event type estimation system according to claim 1, further comprising:

a normal fluctuation recording unit that records normal fluctuation data representing the fluctuation in traffic under normal conditions without anomalous fluctuation in the interval extracted by the deviation testing unit;

a page log aggregation unit implemented by the processor that extracts a plurality of page sets each including at least one page constituting part of the site, and generates, based on the log data, page fluctuation data representing, for each page of the extracted page sets, the fluctuation in traffic, in the interval extracted by the deviation testing unit, of a session group that includes accesses to each page of the page sets; and a session separation unit implemented by the processor that calculates, for each page of the page sets shown by the page fluctuation data generated by the page log aggregation unit, a degree of difference between a fluctuation that combines the fluctuation in traffic of the session group that includes accesses to the page and the fluctuation shown by the normal fluctuation data recorded in the normal fluctuation recording unit, and the fluctuation in traffic in the interval extracted by the deviation testing unit out of the fluctuation in traffic represented by the performance time-series data generated by the log aggregation unit, and selects a target page from the page sets based on the degree of difference, wherein the waveform decomposition unit optimizes the peak fluctuation time-series data, the normal fluctuation time-series data and the vertical fluctuation time-series data, by repeating a process of comparing the composite fluctuation with the fluctuation in traffic of the session group that includes accesses to the target page selected by the session separation unit, out of the fluctuation in traffic represented by the performance time-series data generated by the log aggregation unit.

3. The event type estimation system according to one of claims 1 and 2, further comprising:

a composition ratio increment testing unit implemented by the processor that executes, in relation to each of at least a part of the pages constituting the site, an extracted interval composition ratio calculation process of calculating per page, based on the log data, a proportion of traffic to the part of the pages to traffic to the site as a whole in the interval extracted by the deviation testing unit, a reference interval composition ratio calculation process of calculating per page, based on the log data, a proportion of traffic to the part of pages to traffic to the site as a whole in a prescribed interval prior to the interval extracted by the deviation testing unit, and a process of selecting a target page to be targeted for processing by the waveform decomposition unit, by comparing, per page, the proportion calculated in the extracted interval composition ratio calculation process and the proportion calculated in the reference interval composition ratio calculation process, wherein the waveform decomposition unit optimizes the peak fluctuation time-series data, the normal fluctuation time-series data and the vertical fluctuation time-series data, by repeating a process of comparing the composite fluctuation with the fluctuation in traffic of the session group that includes accesses to the target page selected by the composition ratio increment testing unit out of the fluctuation in traffic represented by the performance time-series data generated by the log aggregation unit.

4. The event type estimation system according to claim 1, further comprising:

a session duration testing unit implemented by the processor that calculates, based on the log data, an access duration of accesses started in each partial interval obtained in a case where the interval extracted by the deviation testing unit is divided at the peak time point of the fluctuation in traffic represented by the peak fluctuation time-series data generated by the peak fluctuation pattern setting unit, wherein the rule recording unit further records a session duration rule showing a relation between an access duration and a type of event that causes anomalous fluctuation, and the event determination unit determines a type of event further using the access duration calculated by the session duration testing unit and the session duration rule.

5. The event type estimation system according to claim 1, wherein the peak fluctuation pattern setting unit generates peak fluctuation time-series data representing a fluctuation pattern in which traffic in each of two different intervals within the interval extracted by the deviation testing unit exhibits an increasing tendency over time from a start time point and, on reaching a time point defining a peak, exhibits a decreasing tendency to an end time point, and records the generated peak fluctuation time-series data in the fluctuation pattern recording unit.

6. An event type estimation method comprising:
   a log aggregation operation in which a log aggregation unit provided in a computer reads log data showing access history from a user terminal to at least one site provided through a network, and outputs performance time-series data representing a fluctuation in traffic to the site based on the log data;
   a deviation testing operation in which a deviation testing unit provided in the computer extracts, from the performance time-series data, an interval showing an anomalous fluctuation in which the fluctuation in traffic deviates from a recorded reference fluctuation;
   a peak fluctuation pattern setting operation in which a peak fluctuation pattern setting unit provided in the computer calculates a steepness and a time point of a peak that appears in the fluctuation in the traffic during all or part of the interval represented by the performance time-series data, generates peak fluctuation time-series data representing a fluctuation pattern that has the steepness and a peak at the time point and records the generated peak fluctuation time-series data in a fluctuation pattern recording unit;
   a normal fluctuation pattern setting operation in which a normal fluctuation pattern setting unit provided in the computer generates, based on the performance time-series data or prerecorded data, normal fluctuation time-series data representing a fluctuation pattern, in the interval extracted in the deviation testing operation, of traffic under normal conditions without anomalous fluctuation, and records the generated normal fluctuation time-series data in the fluctuation pattern recording unit;
   a vertical fluctuation pattern setting operation in which a vertical fluctuation pattern setting unit provided in the computer generates, based on the performance time-series data, vertical fluctuation time-series data representing a fluctuation pattern in which traffic increases or decreases in an interval of part of the interval extracted in the deviation testing operation, and records the generated vertical fluctuation time-series data in the fluctuation pattern recording unit;
   a waveform decomposition operation in which a waveform decomposition unit provided in the computer calculates optimal values of components of the fluctuation patterns respectively represented by the peak fluctuation time-series data, the normal fluctuation time-series data and the vertical fluctuation time-series data, so that a combination of the fluctuation patterns approximates the fluctuation in traffic represented by the performance time-series data; and
   an event determination operation in which an event determination unit provided in the computer determines a type of event that caused the anomalous fluctuation in the interval, based on the values of the components of the fluctuation patterns optimized in the waveform decomposition operation, by referring to a rule recording unit that records a rule showing a relation between a type of event that causes anomalous fluctuation and the composition of the components of the fluctuation patterns respectively represented by the peak fluctuation time-series data, the normal fluctuation time-series data, and the vertical fluctuation time-series data.

7. A recording media storing an event type estimation program that causes a computer to execute:
   a log aggregation process of reading log data showing access history from a user terminal to at least one site provided by a computer connected to a network, and outputting performance time-series data representing a fluctuation in traffic to the site based on the log data;
   a deviation testing process of extracting, from the performance time-series data, an interval showing an anomalous fluctuation in which the fluctuation in traffic deviates from a recorded reference fluctuation;
   a peak fluctuation pattern setting process of calculating a steepness and a time point of a peak that appears in the fluctuation in the traffic during all or part of the interval represented by the performance time-series data, generating peak fluctuation time-series data representing a fluctuation pattern that has the steepness and a peak at the time point and recording the generated peak fluctuation time-series data in a fluctuation pattern recording unit;
   a normal fluctuation pattern setting process of generating, based on the performance time-series data or prerecorded data, normal fluctuation time-series data representing a fluctuation pattern, in the interval extracted in the deviation testing process, of traffic under normal conditions, and recording the generated normal fluctuation time-series data in the fluctuation pattern recording unit;
   a vertical fluctuation pattern setting process of generating, based on the performance time-series data, vertical fluctuation time-series data representing a fluctuation pattern in which traffic increases or decreases in an interval of part of the interval extracted in the deviation testing process, and recording the generated vertical fluctuation time-series data in the fluctuation pattern recording unit;
   a waveform decomposition process of calculating optimal values of components of the fluctuation patterns respectively represented by the peak fluctuation time-series data, the normal fluctuation time-series data and the vertical fluctuation time-series data, so that a combination of the fluctuation patterns approximates the fluctuation in traffic represented by the performance time-series data; and
   an event determination process of determining a type of event that caused the anomalous fluctuation in the interval, based on the values of the components of the fluctuation patterns optimized in the waveform decomposition process, by referring to a rule recording unit that records a rule showing a relation between a type of event that causes anomalous fluctuation and the composition of the components of the fluctuation patterns respectively represented by the peak fluctuation time-series data, the normal fluctuation time-series data, and the vertical fluctuation time-series data.

* * * * *